United States Patent

Tackett

[11] Patent Number: 5,873,141
[45] Date of Patent: Feb. 23, 1999

[54] WINDSHIELD AND WIPER PRESERVATION DEVICE

[76] Inventor: Shelby G. Tackett, 4001 Justice La., Garland, Tex. 75042

[21] Appl. No.: 686,123

[22] Filed: Jul. 23, 1996

[51] Int. Cl.[6] ........................................... B60S 1/04
[52] U.S. Cl. ..................... 15/250.19; 15/250.001; 15/250.16
[58] Field of Search ............ 15/257.01, 250.351, 15/250.19, 250.201, 250.16, 250.001; 248/351, 352, 900

[56] References Cited

U.S. PATENT DOCUMENTS

| 5,081,736 | 1/1992 | Schon | 15/250.351 |
| 5,101,531 | 4/1992 | Edwards et al. | 15/250.19 |

FOREIGN PATENT DOCUMENTS

| 3226258 | 1/1984 | Germany | 15/250.19 |
| 3325707 | 1/1985 | Germany | 15/250.19 |
| 63551 | 4/1983 | Japan | 15/250.19 |
| 113636 | 5/1987 | Japan | 15/250.351 |
| 249349 | 10/1989 | Japan | 15/250.19 |
| 142703 | 12/1989 | Japan | 15/250.351 |

*Primary Examiner*—Gary K. Graham
*Attorney, Agent, or Firm*—Konneker & Smith

[57] ABSTRACT

A device for providing protection from harmful effects produced when a vehicle is stored with its wiper blades in contact with its windshield. In a preferred embodiment, a device has a wiper arm support portion, an elongated body portion, and a windshield contacting portion. Operative installation of the device between the vehicle's wiper arms and the windshield lifts the wiper blades out of contact with the windshield.

15 Claims, 1 Drawing Sheet

WINDSHIELD AND WIPER PRESERVATION DEVICE

BACKGROUND OF THE INVENTION

The present invention relates generally to devices associated with windshields and wipers and, in a preferred embodiment thereof, more particularly provides a device which is usable for preserving windshields and wipers.

It is well known that virtually all vehicles are equipped with windshields and windshield wipers, excepting most motorcycles. A windshield serves to protect and shield the vehicle's occupants from the elements, and the windshield wipers serve to clean and clear the windshield's outer surface so that it is easy to see through the windshield. Some vehicles, such as airplanes, also utilize windshields as barriers between air pressure inside the airplanes and air pressure external to the airplanes.

Unfortunately, when wipers are allowed to remain in operative contact with windshields for extended periods of time, many harmful effects are produced. These harmful effects are known to occur, for example, with recreational vehicles, airplanes, and utility vehicles, which are used only occasionally, intermittently, or are otherwise stored periodically without their wipers being activated.

One harmful effect is that, while a wiper is in operative contact with a windshield, biasing members, such as springs, within an arm supporting a wiper blade proximate the windshield, typically force the wiper blade against the windshield and thereby produce a deflection of the wiper blade. Generally, the wiper blade is made of a rubber-like material which tends to be resilient, but prolonged deflection of the wiper blade usually causes it to retain the deflection. Such retained deflection, in turn, causes the wiper blade to perform poorly when it is subsequently called upon to clean or clear the windshield. For this reason, a wiper blade having a retained deflection will usually be rejected during a periodic vehicle inspection, resulting in an economic cost for replacement of the wiper blade which may be quite significant, particularly in the case of an airplane wiper blade.

Another harmful effect is that a wiper blade, having been biased into contact with a windshield for a prolonged period of time, tends to become adhered to the windshield. This situation is encountered most often when the vehicle has been stored in hot weather conditions. When the wiper is subsequently activated, the wiper blade must be forcefully torn from the windshield, possibly severing portions of the wiper blade or otherwise damaging the wiper mechanism. This situation may also occur in cold weather conditions when frozen rain, frost, etc. adheres the wiper blade to the windshield.

Still another harmful effect is that moisture tends to collect about a wiper blade when it is stored in contact with a windshield. Such prolonged exposure to moisture can degrade the wiper blade material, making it hard, brittle, and otherwise prone to cracking and poor performance.

Yet another harmful effect is that dirt, sand, dust, grit, etc. tends to collect on upper surfaces of the wiper blade and about a line of contact between the wiper blade and the windshield. If left uncleaned, when the wiper is subsequently activated, the wiper blade will typically scrape the sand, grit, etc. across the outer surface of the windshield. Repeated occurrences will abrade multiple arcs into the outer surface of the windshield, making the windshield difficult to see through. In extreme cases, the windshield may have to be replaced, which is very costly, particularly for airplane windshields.

From the foregoing, it can be seen that it would be quite desirable to provide a device which preserves wipers and windshields, prevents wiper blades from adhering to windshields, prevents accumulation of moisture about wiper blades during storage, prevents accumulation of dirt, grit, etc. between and about wiper blades and windshields during storage, and prevents wiper blades from retaining deflection as a result of prolonged operative contact with windshields. It is accordingly an object of the present invention to provide such a device and associated methods of preserving wipers and windshields.

SUMMARY OF THE INVENTION

In carrying out the principles of the present invention, in accordance with an embodiment thereof, a device is provided which is a uniquely configured wiper blade lifting device, utilization of which permits a user to easily lift a wiper blade out of contact with a windshield.

In broad terms, a device for spacing a wiper blade apart from a windshield, the wiper blade being attached to a wiper arm, and the wiper arm being biased toward the windshield. The device includes an elongated body portion with first and second opposite end portions.

The first opposite end portion is capable of contacting the windshield. The second opposite end portion is capable of supporting the wiper arm thereon in a spaced apart relationship to the windshield when the first opposite end portion contacts the windshield.

Also provided is a device for spacing a wiper blade apart from a windshield, the wiper blade being attached to a wiper arm, and the wiper arm being biased toward the windshield. The device includes a support portion, an elongated portion, and a windshield contacting portion.

The elongated portion is interconnected between the support portion and the windshield contacting portion. The windshield contacting portion is capable of contacting the windshield. The support portion is capable of supporting the wiper arm thereon in a spaced apart relationship to the windshield when the windshield contacting portion contacts the windshield.

Furthermore, a method of spacing a wiper arm away from a windshield, the wiper arm being biased toward the windshield, is provided by the present invention. The method includes the steps of providing a device having means for engaging the wiper arm, means for contacting the windshield, and elongated means, interconnected between the engaging means and the contacting means, for spacing apart the engaging means and the contacting means; positioning the device between the wiper arm and the windshield; supporting the wiper arm on the engaging means; and contacting the windshield with the contacting means.

The use of the disclosed device and associated methods preserves a vehicle's wipers and windshield. Such use is convenient and economical for the user.

DETAILED DESCRIPTION

Figure 1:
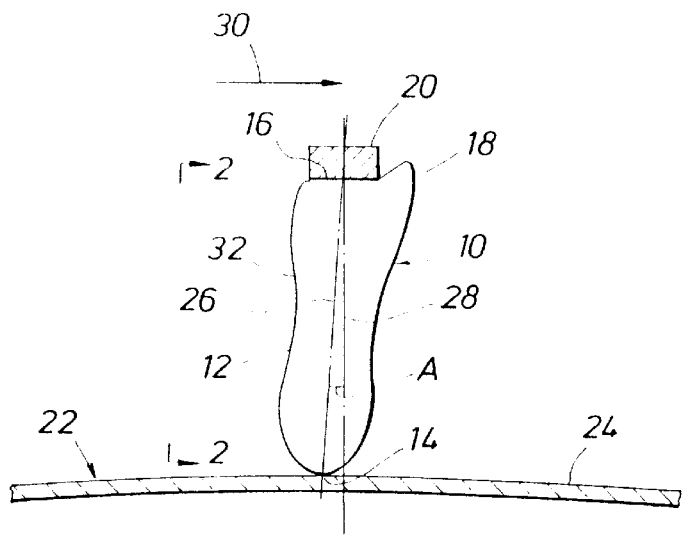
FIG. 1 is a side elevational view of a first device embodying principles of the present invention, the device being shown operatively installed between a wiper arm and a windshield.

Illustrated in FIG. 1 is a device 10 which embodies principles of the present invention. The device 10 includes an elongated body 12, a windshield contacting end 14, a wiper arm support platform 16, and a projection 18. The device 10 is shown in FIG. 1 operatively installed between a conventional rectangular cross-sectioned wiper arm 20 and a generally outwardly curved glass windshield 22. It is to be understood that the device 10 may be utilized with otherwise configured wiper arms and windshields without departing from the principles of the present invention.

The device 10 is preferably constructed of a lightweight and easily fabricated material, such as plastic, but may also be constructed of wood, phenolic, rubber, etc. The material should be substantially capable of holding its shape and yet be unlikely to unintentionally mar an outer side surface 24 of the windshield 22.

As representatively illustrated in FIG. 1, the device 10 is maintaining a predetermined separation between the wiper arm 20 and the windshield 22, thereby preventing a wiper blade (not shown in FIG. 1) attached to the wiper arm from contacting the windshield. As is readily appreciated by one of ordinary skill in the art, a wiper blade may be displaced away from a windshield by separating a wiper arm, to which the wiper blade is attached, from the windshield. Thus, when the device 10 is positioned between the wiper arm 20 and the windshield 22, thereby displacing the wiper arm away from the windshield, the wiper blade is also displaced away from, and out of contact with, the windshield.

The device 10 is uniquely configured so that it is capable of conveniently supporting the wiper arm 20 spaced apart from the windshield 22. The platform 16 is laterally sloped somewhat relative to a longitudinal axis 26 extending through the body 12. Thus, with the wiper arm 20 being supported by the platform 16 and the end 14 in contact with the windshield 22, an acute angle A is formed between the axis 26 and a line 28 drawn through the wiper arm perpendicular to the windshield.

When operatively installed as shown in FIG. 1, the device 10 does not tip over as a result of the inwardly biasing force produced by biasing members (not shown) urging the wiper arm 20 toward the windshield 22, because the end 14 contacts the windshield at a point beneath the wiper arm. Alternatively, where the wiper arm 20 is restrained from lateral movement by the wiper mechanism during inactivity, the device 10 may be prevented from tipping over due to frictional contact between the device and the windshield 22 and/or wiper arm.

It is to be understood that the device 10 may also be oriented perpendicular to the windshield 22, that the wiper arm 20 may not rest flat on the platform 16, and that the device may be otherwise tilted during operation without departing from the principles of the present invention.

If the device 10 is left operatively installed between the wiper arm 20 and the windshield 22 when the wiper mechanism is activated, it is preferred that the device readily tip over and fall out from between the wiper arm and windshield, so that the wiper blade may again operatively contact the windshield. For this purpose, the device 10 is provided with the projection 18 extending outwardly relative to the platform 16. For example, if the wiper mechanism is activated to laterally displace the wiper arm 20 in a direction indicated by arrow 30, the wiper arm may laterally contact the projection 18 and thereby tip over the device 10. The device 10 may then conveniently and harmlessly fall away from the windshield 22.

Figure 2:
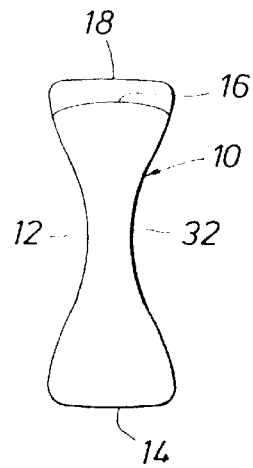
FIG. 2 is a side elevational view of the first device, taken along line 2—2 of FIG. 1.

Referring additionally now to FIG. 2, the device 10 is shown as viewed from line 2—2 of FIG. 1. In this view it may be clearly seen that the body 12 includes a laterally reduced portion 32. The portion 32 is inwardly curved relative to the remainder of the body 12, making the device 10 convenient to grasp and position using a person's fingers.

In FIG. 2 it may also be clearly seen that the end 14 is laterally elongated, giving a line contact with the windshield 22 when it is operatively installed. Such line contact gives the device 10 lateral stability in a direction parallel to the wiper arm 20, thereby preventing the device from tipping over in that direction. However, it is to be understood that the end 14 may be otherwise configured, for example, to give a point or area contact with the windshield 22 when it is operatively installed, without departing from the principles of the present invention.

Figure 3:
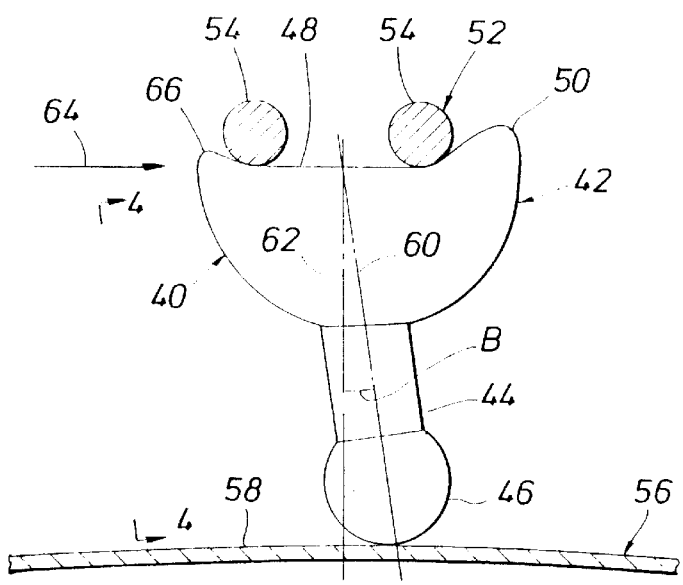
FIG. 3 is a side elevational view of a second device incorporating principles of the present invention, the device being shown operatively installed between a wiper arm and a windshield.

Turning now to FIG. 3, a device 40 which embodies principles of the present invention is representatively illustrated. The device 40 includes a wiper arm support portion 42, an elongated shaft 44, and a generally spherically-shaped windshield contacting end 46. The wiper arm support portion 42 includes a wiper arm support platform 48, and a projection 50.

The device 40 is shown in FIG. 3 operatively installed between a conventional wiper arm assembly 52 having dual circular cross-sectional arms 54 and a generally outwardly curved glass windshield 56. It is to be understood that the device 40 may be utilized with otherwise configured wiper arms and windshields without departing from the principles of the present invention.

As with device 10, the device 40 is preferably constructed of a lightweight and easily fabricated material, such as plastic, but may also be constructed of wood, phenolic, rubber, etc. The material should be substantially capable of holding its shape and yet be unlikely to unintentionally mar an outer side surface 58 of the windshield 56.

As representatively illustrated in FIG. 3, the device 40 is maintaining a predetermined separation between the wiper arm assembly 52 and the windshield 56, thereby preventing a wiper blade (not shown in FIG. 3) attached to the wiper arms 54 from contacting the windshield. Thus, when the device 40 is positioned between the wiper arms 54 and the windshield 56, thereby displacing the wiper arms away from the windshield, the wiper blade is also displaced away from, and out of contact with, the windshield.

The device 40 is uniquely configured so that it is capable of conveniently supporting the wiper arm assembly 52 spaced apart from the windshield 56. The platform 48 is laterally sloped somewhat relative to a longitudinal axis 60 extending through the device 40. Thus, with the wiper arms 54 being supported by the platform 48 and the end 46 in contact with the windshield 56, an acute angle B is formed between the axis 60 and a line 62 drawn through the intersection of the axis and the platform 48 perpendicular to the windshield.

When operatively installed as shown in FIG. 3, the device 40 does not tip over as a result of the inwardly biasing force produced by biasing members (not shown) urging the wiper arm assembly 52 toward the windshield 56, because the end 46 contacts the windshield at a point beneath the wiper arm. Alternatively, where the wiper arm assembly 52 is restrained from lateral movement by the wiper mechanism during inactivity, the device 40 may be prevented from tipping over due to frictional contact between the device and the windshield 56 and/or wiper arm.

It is to be understood that the device 40 may also be oriented perpendicular to the windshield 56, that the wiper arm assembly 52 may not rest flat on the platform 48 (i.e., with all arms 54 supported by the platform), and that the device may be otherwise tilted during operation without departing from the principles of the present invention.

If the device 40 is left operatively installed between the wiper arm assembly 52 and the windshield 56 when the wiper mechanism is activated, it is preferred that the device readily tip over and fall out from between the wiper arm and windshield, so that the wiper blade may again operatively contact the windshield. For this purpose, the device 40 is provided with the projection 50 extending outwardly relative to the platform 48. For example, if the wiper mechanism is activated to laterally displace the wiper arm assembly 52 in a direction indicated by arrow 64, the wiper arm assembly may laterally contact the projection 50 and thereby tip over the device 40. The device 40 may then conveniently and harmlessly fall away from the windshield 56.

If the wiper mechanism is activated to laterally displace the wiper arm assembly 52 in a direction opposite to that indicated by arrow 64, the wiper arm assembly may laterally contact another projection 66 extending outwardly from the platform 48, tip over the device 40, and permit the device 40 to fall away from the windshield 56. Thus, if the wiper arm assembly 52 displaces in either lateral direction, the device 40 will be conveniently removed from the windshield, permitting operative contact between the wiper blade and the windshield surface 58.

Note that, as shown in FIG. 3, the platform 48 would be sloped laterally downward toward the projection 50 if the axis 60 were aligned with the line 62. This is oppositely sloped as compared to the platform 16 as shown in FIG. 1. It is to be understood that the platforms 48 and 16 may be otherwise configured without departing from the principles of the present invention.

Figure 4:
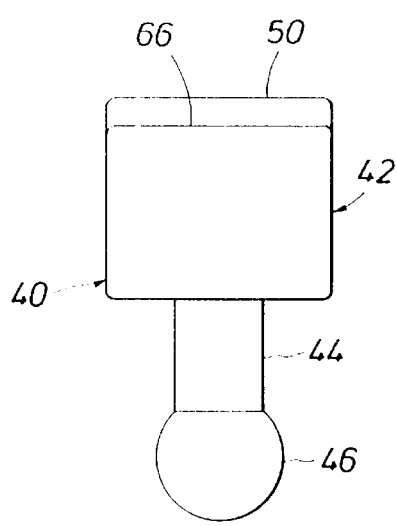
FIG. 4 is a side elevational view of the second device, taken along line 4—4 of FIG. 3.

Referring additionally now to FIG. 4, the device 40 is shown as viewed from line 4—4 of FIG. 3. In this view it may be clearly seen that the support portion 42 is generally rectangular-shaped.

Note that, the end 46 being generally spherically-shaped, gives a point contact with the windshield 56 when it is operatively installed. However, it is to be understood that the end 46 may be otherwise configured, for example, to give a line or area contact with the windshield 56 when it is operatively installed, without departing from the principles of the present invention.

Figure 5:
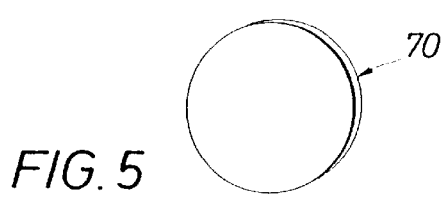
FIG. 5 is a front perspective view of a reminder disk incorporating principles of the present invention.

FIG. 5 shows a token or disk 70. The disk 70 may be utilized for reminding a person that devices, such as devices 10 and/or 40 are installed on a vehicle, and that they should be removed before operating the vehicle. For example, the disk 70 may be brightly colored and/or have a slogan or sign imprinted thereon, and may be placed in a driver's seat when the devices 10 and/or 40 are installed. Subsequently, when the vehicle is re-entered for operation thereof, the driver will notice the disk 70 in the driver's seat and be reminded to remove the devices 10 and/or 40 before operating the vehicle.

As another method of reminding the driver or other occupant of the vehicle that the devices 10 and/or 40 are installed is to provide the devices with brightly colored or illuminated portions, so that they are highly visible through the windshield of the vehicle. In particular, the ends 14 and/or 46 may be colored red, orange, etc.

In operation, when a vehicle is to be stored or otherwise unused for an extended period of time, the device 10 and/or 40 is operatively installed by displacing the wiper arm(s) 20 and/or 54 away from the windshield 22 or 56, and disposing the device between the wiper arm(s) and windshield, thereby bringing the wiper blades out of contact with the windshield.

The foregoing detailed description is to be clearly understood as being given by way of illustration and example only, the spirit and scope of the present invention being limited solely by the appended claims.

What is claimed is:

1. In a windshield system including a wiper arm supporting a wiper blade, the arm being biased towards a windshield to engage the blade therewith, a spacing device is provided to space the wiper blade apart from the windshield, the device comprising:

an elongated body portion having first and second opposite end portions;

said first opposite end portion releasably contacting the windshield when the body portion is positioned between the wiper arm and the windshield; and said second opposite end portion releasably supporting the wiper arm thereon in a spaced apart relationship to the windshield when said first opposite end portion contacts the windshield and the body portion is positioned between the wiper arm and the windshield, said first and second end opposite portions being free from attachment to the wiper arm and windshield, and upon displacement of the wiper arm from a parked position, said second opposite end portion disengages from the wiper arm and said first opposite end portion disengages from the windshield, such that the wiper blade comes into contact with the windshield, with the device falling away.

2. The device according to claim 1, wherein said second opposite end portion has an outwardly facing platform formed thereon, said platform being capable of receiving the wiper arm thereon.

3. The device according to claim 2, wherein said platform is laterally sloped.

4. The device according to claim 3, further comprising an outwardly extending projection formed adjacent said platform, whereby lateral displacement of the wiper arm relative to said platform is capable of bringing the wiper arm into contact with said projection.

5. The device according to claim 1, wherein said first opposite end is laterally elongated.

6. The device according to claim 1, wherein said body portion further includes a laterally reduced portion between said first and second opposite ends.

7. The device according to claim 1, wherein said body portion further includes a platform formed on said second opposite end, said platform being laterally sloped relative to a longitudinal axis extending through said body portion.

8. In a windshield system including a wiper arm supporting a wiper blade, the arm being biased towards a windshield to engage the blade therewith, a spacing device is provided to space the wiper blade apart from the windshield, the device comprising:

a support portion;

an elongated portion; and a windshield contacting portion;

said elongated portion being interconnected between said support portion and said windshield contacting portion;

said windshield contacting portion releasably contacting the windshield when the device is interposed between the windshield and the wiper arm; and said support portion releasably supporting the wiper arm thereon, such that the wiper arm is in a spaced apart relationship to the windshield when said windshield contacting portion contacts the windshield, and the support portion being displaceable independently of the wiper arm when said windshield contacting portion does not contact the windshield, said support portion and said windshield contacting portion being free from attachment to the wiper arm and windshield, and upon displacement of the wiper arm from a parked position, said support portion disengages from the wiper arm and said windshield contacting portion disengages from the windshield, such that the wiper blade comes into contact with the windshield, with the device falling away.

9. The device according to claim 8, wherein said support portion has an outwardly facing platform formed thereon, said platform being capable of receiving the wiper arm thereon.

10. The device according to claim 9, wherein said platform is laterally sloped.

11. The device according to claim 10, further comprising an outwardly extending projection formed adjacent said platform, whereby lateral displacement of the wiper arm relative to said platform is capable of bringing the wiper arm into contact with said projection.

12. The device according to claim 8, wherein said windshield contacting portion is spherically-shaped.

13. The device according to claim 8, wherein said elongated portion comprises a shaft.

14. The device according to claim 8, wherein said support portion further includes a platform formed thereon, said platform being laterally sloped relative to a longitudinal axis extending through said elongated portion.

15. In a windshield system including a wiper arm supporting a wiper blade, the arm being biased towards a windshield to engage the blade therewith, a spacing device is provided to space the wiper blade apart from the windshield, the device comprising:

means for engaging the wiper arm, said engaging means being configured to disengage from the wiper arm when the wiper arm is displaced relative to the windshield;

means for contacting the windshield, said contacting means being free of attachment to the windshield; and elongated means, interconnected between said engaging means and said contacting means, for spacing apart said engaging means and said contacting means, said engaging means being free from attachment to the wiper arm, and upon displacement of the wiper arm from a parked position, said engaging means disengages from the wiper arm and said contacting means disengages from the windshield, such that the wiper blade comes into contact with the windshield, with the device falling away.

* * * * *